United States Patent
Wang et al.

(10) Patent No.: US 10,935,468 B2
(45) Date of Patent: Mar. 2, 2021

(54) COMPACT TESTING MODULE, AUTOMATED SYSTEM AND APPROACH FOR HYDRAULIC DAMPER VALVE EXPERIMENTS

(71) Applicants: Dongguan University of Technology, Guangdong (CN); Zhuzhou Lince Group Shock Absorber Co., Ltd, Hunan (CN)

(72) Inventors: Wenlin Wang, Guangdong (CN); Youquan Fan, Hunan (CN); Moujun Dai, Hunan (CN); Zirong Zhou, Guangdong (CN); Ling Yin, Guangdong (CN)

(73) Assignees: DONGGUAN UNIVERSITY OF TECHNOLOGY, Dongguan (CN); Zhuzhou Lince Group Shock Absorber Co., Ltd, Zhuzhou (CN)

( * ) Notice: Subject to any disclaimer, the term of this patent is extended or adjusted under 35 U.S.C. 154(b) by 0 days.

(21) Appl. No.: 16/627,770

(22) PCT Filed: Sep. 11, 2018

(86) PCT No.: PCT/CN2018/105002
§ 371 (c)(1),
(2) Date: Dec. 31, 2019

(87) PCT Pub. No.: WO2019/047968
PCT Pub. Date: Mar. 14, 2019

(65) Prior Publication Data
US 2020/0378869 A1 Dec. 3, 2020

(30) Foreign Application Priority Data
Sep. 11, 2017 (CN) .......................... 201710810850.1

(51) Int. Cl.
*G01M 17/04* (2006.01)
*F16F 9/34* (2006.01)
(Continued)

(52) U.S. Cl.
CPC ............... *G01M 17/04* (2013.01); *F16F 9/34* (2013.01); *F16F 9/185* (2013.01); *F16F 9/3242* (2013.01); *F16F 2222/12* (2013.01)

(58) Field of Classification Search
CPC ...... B60G 17/018; G01M 17/04; G01M 17/10
(Continued)

(56) References Cited

U.S. PATENT DOCUMENTS

2008/0250844 A1* 10/2008 Gartner ................. F16F 9/3264
73/11.07
2008/0275681 A1* 11/2008 Langer .................. G01M 17/04
703/8
(Continued)

FOREIGN PATENT DOCUMENTS

| CN | 201245154 Y | 5/2009 |
| CN | 202748228 U | 2/2013 |
| CN | 204061690 U | 12/2014 |

OTHER PUBLICATIONS

International Preliminary Report on Patentability of PCT Patent Application No. PCT/CN2018/105002 dated Mar. 17, 2020.

*Primary Examiner* — Christopher P Schwartz

(57) ABSTRACT

A compact testing module (1) for use in dynamic characteristics experiments of hydraulic damper valve under extreme high or low temperature conditions, an automated system and approach based on the compact testing module (1). The compact testing module (1) comprises an outer cylinder assembly (2), a guide seat assembly (3), a foam/air separator for guide seat (4), an inner cylinder (5), a piston-and-rod assembly (6), fluids (7), a foot valve assembly (8), a washer for inner cylinder (9), a washer for foot valve
(Continued)

assembly (10), a fluid-guiding structure (11), a magnet (12), a fluid-returning assembly (13), a framework oil seal (14), a screw cover (15) and a dust wiper (16). Based on the integrated design principle, the compact testing module (1) allows the fluids (7), the pressure fluid supplier, the hydraulic damper valve being tested (32), the pressure sensors be all integrated in one component.

9 Claims, 13 Drawing Sheets

(51) Int. Cl.
    *F16F 9/18* (2006.01)
    *F16F 9/32* (2006.01)

(58) Field of Classification Search
    USPC .... 188/315, 322.14, 322.16–322.18, 322.15, 188/322.22; 73/11.04, 11.07–11.09
    See application file for complete search history.

(56) References Cited

U.S. PATENT DOCUMENTS

| | | | |
|---|---|---|---|
| 2009/0171532 A1* | 7/2009 | Ryan | B60G 17/06 701/37 |
| 2017/0199103 A1* | 7/2017 | Konakai | G01N 29/4436 |

* cited by examiner

A-A

B-B

COMPACT TESTING MODULE, AUTOMATED SYSTEM AND APPROACH FOR HYDRAULIC DAMPER VALVE EXPERIMENTS

CROSS REFERENCE TO RELATED APPLICATIONS

This application is a national phase entry of the international application PCT/CN2018/105002, filed on Sep. 10, 2018, which claims priority to Chinese Patent Application No. 201710810850.1, filed with the Chinese Patent Office on Sep. 11, 2017 and entitled "TESTING MODULE AND SYSTEM FOR USE INHYDRAULIC SHOCK ABSORBER DAMPING VALVE EXPERIMENTS AND EXPERIMENTATION METHOD", which is incorporated herein by reference in its entirety.

TECHNICAL FIELD

This application relates to a compact testing module, an automated measurement and control system, and a test approach capable of testing the dynamic characteristics of the hydraulic damper valve under extreme high or low temperature conditions, and belongs to technical field of testing apparatus of hydraulic component, experimentation approach of hydraulic component, and product testing technology for hydraulic damper.

BACKGROUND

Hydraulic dampers are key components in the stability and ride comfort control of modern railway vehicle system, further on, the damper valves are key inner components in a hydraulic damper which govern the damping characteristics of the hydraulic damper. Thus, it is significant to test and understand the dynamic characteristics of the hydraulic damper valves. In addition, with the development of modern high-speed trains, it is possible for a high-speed train in one day to run from a very cold area where the ambient temperature is below −40° C. to a hot area with ambient temperature above 35° C., so it is both necessary and challengeable to test the dynamic characteristics of the hydraulic damper valves under extreme high or low temperature conditions.

So far, whether in current product standards and testing apparatus for railway hydraulic damper, or in current research of damping characteristics, there is no effective technology to test the dynamic characteristics of the hydraulic damper valve, especially under extreme high or low temperature conditions.

A test system for testing the "Flow-Pressure Performance" of an automotive shock absorber piston valve is introduced in the prior art. The test system has the following features:

(1) The "Off-line" testing approach is used. The "Off-line" means that the valve is devised in a separate apparatus and tested alone, it is not tested when it is in a shock absorber or a module like a shock absorber, i.e., it is not tested "On-line".

(2) A set of hydraulic system including hydraulic pumps, various hydraulic control valves, and oil tanks is used to supply pressure oil to the piston valves, so the system is complex and bulky.

(3) A set of oil temperature control system including refrigeration and heating devices is specially designed to maintain the constant oil temperature of the system. This test method is feasible at normal temperature, but it is not feasible to apply the above method at high or low temperature, especially at low temperature. Because at low temperatures, such as below −30° C., general hydraulic pump cannot even suck oil effectively, and many hydraulic control valves and pipelines cannot work properly, so it is not feasible to perform any effective and accurate valve experiments; furthermore, under extreme high or low temperature, it is neither convenient nor energy efficient to perform temperature control on the hydraulic oil of the entire hydraulic system.

(4) Only the "Flow-Pressure Performance" of the piston valve can be tested, and its dynamic characteristics including such as response performance and open-and-close performance thereof cannot be tested.

In order to test the dynamic characteristics of hydraulic damper valve under extreme high or low temperature conditions, the conventional test methods in the prior art are not feasible, so a new testing principle and testing module, automatic measurement and control system and experimentation approach should be proposed. The invention must specifically solve the following technical issues:

(1) Using the integrated design principle, the fluids, the pressure fluid supplier, the hydraulic damper valve being tested and the sensors should be all integrated in one small testing module similar to a hydraulic shock absorber product, the whole testing module can be readily placed in a high-low temperature test chamber. Thus, the all-in-one compact testing module can make a convenient, effective and accurate solution of the oil temperature control problem in the traditional hydraulic damper valve experiments.

(2) Under extreme high or low temperature conditions, to test the dynamic characteristics of the hydraulic damper valve, an automated testing system should be designed to excite the compact testing module by a servo actuator, the excitation signals should include various functions such as the step, the saw-tooth ones, and the signal parameters can be regulated.

(3) The automated testing system can control the temperature of the compact testing module and input various excitation signals, it can also automatically measure the temperature, pressure and flow rate of the fluids passing through the hydraulic damper valve being tested, and save the data for post processing, output and database documentation.

SUMMARY

The application adopts the following technical solutions:

A testing module for use in the dynamic characteristics experiments of a hydraulic shock absorber damping valve includes an outer cylinder assembly, a guide seat assembly, a foam/air separator, an inner cylinder with an inner chamber, a piston-and-rod assembly, fluids, a foot valve assembly, a washer for the inner cylinder, a washer for the foot valve assembly, a fluid-guiding structure, a magnet, a fluid-returning assembly, a framework oil seal, a screw cover and a dust wiper. The fluid-guiding structure is connected with and placed in the bottom of the outer cylinder assembly, the washer for the foot valve assembly is placed on the seat of the fluid-guiding structure, and the foot valve assembly is placed on the washer; the washer for the inner cylinder is placed in an annulus groove in a valve body of the foot valve assembly, and the inner cylinder is placed on the washer; the foam/air separator is placed on the inner cylinder, and the guide seat assembly is placed on the foam/air separator; the guide seat assembly is connected with an outer cylinder in the outer cylinder assembly by threads, when screwing down the guide seat assembly, it will press and fix the foam/air separator, the inner cylinder, the washer for the inner cylinder and the foot valve assembly together against the bottom of the outer cylinder assembly; the outside surfaces of the framework oil seal, the screw cover and the dust wiper are connected with the guide seat assembly, and the inside surfaces are connected with the piston-and-rod assembly; the outside surface of the piston in the piston-and-rod assembly is connected with the inside surface of the inner cylinder, the piston can slide in the inner cylinder, the rod passes through the guide seat assembly, the framework oil seal, the screw cover and the dust wiper; the upper part of the fluid-returning assembly is connected with the inner cylinder, and the lower part is connected with the fluid-guiding structure; the magnet is connected with the fluid-guiding structure; all of the inner chamber of the inner cylinder and over two-third of a chamber between the inner cylinder and the outer cylinder of the outer cylinder assembly is filled with fluids.

In addition, the outer cylinder assembly includes an outer cylinder and an end attachment, the outer cylinder is welded with the end attachment to form an integrated container; the fluid-guiding structure includes a seat and a guiding plate; the foot valve assembly includes a screw cap, a spiral spring, a shim and a valve body, after passing through the spiral spring and the shim, the screw cap is connected with the valve body by threads.

In addition, the guide seat assembly includes a guide seat, a valve being tested, a safety valve, a pressure sensor, an end seal for pressure sensor, a temperature sensor, an end seal for temperature sensor, a wear ring and a Glyd ring. The valve being tested includes an adjusting screw cap, an anti-loose seal for the adjusting screw cap, two adjusting washers, a valve spring, a valve spool and a valve seat. The valve seat is usually pressed into the hole in the guide seat using a special tool; the valve spool is placed on the valve seat and can slide in the valve house of the guide seat; the valve spring is seated in the valve spool, and one of the two adjusting washers is placed between the valve spring and the valve spool; the adjusting screw cap is placed on the top of the valve spring, and the other of the two adjusting washers is placed between the adjusting screw cap and the valve spring; the adjusting screw cap is connected with the valve house of the guide seat by threads such that screwing the adjusting screw cap will adjust the initial length of the valve spring; the anti-loose seal, which is made of oil resistant rubber, is placed in the annulus groove in the adjusting screw cap, and serves as both a seal and an anti-loose element.

In addition, the safety valve has almost the similar structure to that of the valve being tested, except for a different valve seat; In most of the cases, the safety valve remains closed, however, it will open and relieve the fluids when the fluid pressure is very high and exceeds the preset value.

In addition, the pressure sensor and the temperature sensor are all connected with the guide seat by its threads, two similar seals are placed between the sensors and the guide seat.

In addition, the wear ring and the Glyd ring are respectively placed in different annulus grooves in the inside surface of the guide seat, the wear ring can reduce wears of the rod and the guide seat, the Glyd ring is a combined high pressure seal.

In addition, the piston-and-rod assembly includes a rod, a piston valve unit, a piston, a Glyd ring, a wear ring, an inner hexagon screw and a foam/air separator. The piston valve unit includes a cover, a wave spring and a shim; after passing through the piston valve unit, the rod is connected with the piston by its threads, and finally makes the rod, the piston valve unit and the piston to be one assembly; the piston can slide in the inner cylinder, the Glyd ring and the wear ring are all placed in the annulus grooves in the outside surface of the piston, the Glyd ring serves as a high pressure seal between the piston and the inner cylinder, the wear ring can reduce wears of the piston and the inner cylinder; the other end of the rod sequentially passes through the inside surface of the guide seat, the framework oil seal and the dust wiper; the framework oil seal prevents fluid leakage from the gap between the rod and the guide seat, the dust wiper resists dust invasion to the compact testing module by wiping the moving rod.

In addition, the fluid-returning assembly includes a seal, a stop ring, a connector and a fluid-returning pipe. The seal is placed on the stop ring, the seal and the stop ring are fixed on the inner cylinder by wrapping the outside surface of the inner cylinder; the connector is screwed in the stop ring; one end of the fluid-returning pipe is connected with the connector, while another end is inserted into the fluid-guiding structure.

An automated system based on the proposed compact testing module comprises a high-low temperature test chamber for receiving the compact testing module, and a servo actuator assembly for exciting the compact testing module to test the dynamic characteristics of the valve being tested in the compact testing module.

In addition, the automated system further includes a test bench, a hydraulic power station, a control cabinet, an electrical power cabinet, control signal or weak current cables, strong current cables and hydraulic power hoses.

In addition, the test bench includes a base, fixing structure for the high-low temperature test chamber, the high-low temperature test chamber, stand columns, a cross beam, a mechanism to adjust the cross beam position, cross beam fasteners, connectors to fix the compact testing module and an installation block for the servo actuator.

In addition, the base is a heavy structure made of cast iron or steel; the stand columns, which are the main components bearing the load, are connected with the base by bolts or plug pins; the test bench usually employs two or four stand columns; the cross beam can slide along the stand columns, when a proper position is adjusted, the cross beam can be fixed on the stand columns; one end of the fixing structure is connected with the base, while another end is connected with the high-low temperature test chamber, thus, the high-low temperature test chamber is installed on the base.

An experimentation approach based the proposed compact testing module and the automated system mainly uses a software in the host computer to control the testing process. In most of the cases, parameters presetting should be performed firstly by the GUI of the software, and then the testing can be carried out automatically when started; Because the travel of the compact testing module is limited, so for both safety and convenience considerations, the testing process is usually controlled by a combination of manual and automatic manipulations.

The proposed technology has the following effects:

(1) It is a new technology capable of testing the dynamic characteristics of a hydraulic damper valve under extreme high or low temperature conditions.

(2) The fluids, the pressure fluid supplier, the hydraulic damper valve being tested and the sensors are all integrated in one small testing module, and the whole testing module can be readily placed in a high-low temperature test chamber. Thus, the all-in-one compact testing module can make a convenient, effective and accurate solution of the oil temperature control problem in the traditional hydraulic damper valve experiments.

The compact testing module is a full new concept with novel mechanism and approach, it has solved the unwieldy and cost-ineffective problems of current testing apparatus which employs a large and complicated hydraulic power unit and temperature control system.

(3) The proposed automated testing system based on the compact testing module can conveniently and accurately control the testing temperature, then test the dynamic characteristics of the hydraulic damper valve under that temperature by exciting the compact testing module using a servo actuator, and finally save the data for post processing, output and database documentation. Because of the modularization and integration approaches are used in the system design, the modules and facilities of the system can be easily connected or disconnected by simply connect or disconnect the various cables and hydraulic power hoses, so it is very convenient to perform system installation, adjusting, move and management.

(4) The proposed experimentation approach based the compact testing module and the automated system can input various excitation signals such as the step and the saw-tooth functions, and the signal parameters can be readily preset, thus, it makes the testing procedure be very convenient and accurate; In addition, the abundant post processing functions of the software also makes it convenient to obtain desired curves and includes.

Figure 1:
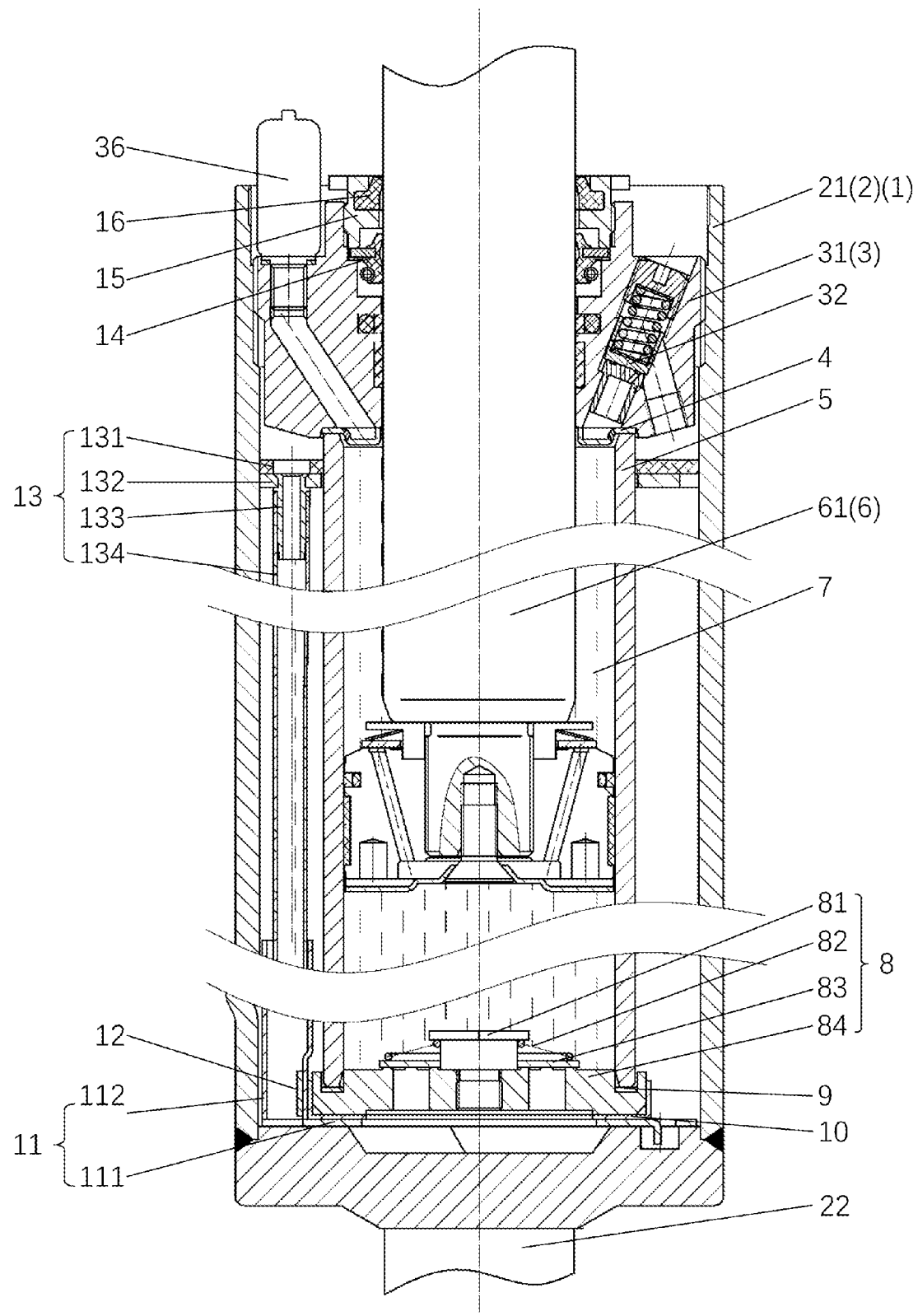
FIG. 1 is a structural illustration of a testing module for dynamic characteristics experiments of hydraulic damper valve according to this application.
Figure 2:
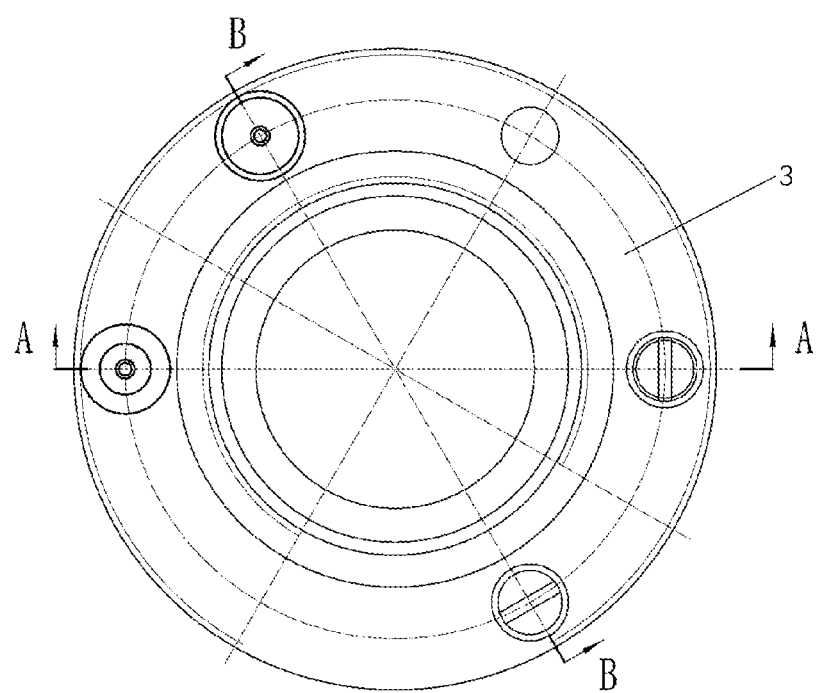
FIG. 2 is a structural illustration of a guide seat assembly in the compact testing module.

1, compact testing module for dynamic characteristics experiments of hydraulic damper valve; 2, outer cylinder assembly; 21, outer cylinder; 22, end attachment of outer cylinder; 3, guide seat assembly; 31, guide seat; 32, valve being tested; 321, adjusting screw cap of valve being tested; 322, anti-loose seal for adjusting screw cap; 323, adjusting washer; 324, spring of valve being tested; 325, spool of valve being tested; 326, seat of valve being tested; 33, wear ring of guide seat; 34, Glyd ring of guide seat; 35, end seal for the pressure sensor; 36, pressure sensor; 37, safety valve; 371, adjusting screw cap of safety valve; 372, anti-loose seal for the adjusting screw cap of safety valve; 373, adjusting washer between the adjusting screw cap and spring of safety valve; 374, spring of safety valve; 375, spool of safety valve; 376, seat of safety valve; 38, end seal for the temperature sensor; 39, temperature sensor; 4, foam/air separator for guide seat; 5, inner cylinder; 6, piston-and-rod assembly; 61, rod; 62, piston valve unit; 621, cover of piston valve; 622, wave spring of piston valve; 623, shim of piston valve; 63, piston; 64, Glyd ring of piston; 65, wear ring of piston; 66, inner hexagon screw; 67, foam/air separator for piston; 7, fluids; 8, foot valve assembly; 81, screw cap of foot valve; 82, spiral spring of foot valve; 83, shim of foot valve; 84, valve body of foot valve; 9, washer for the inner cylinder; 10, washer for the foot valve assembly; 11, fluid-guiding structure; 111, seat of fluid-guiding structure; 112, guiding plate of fluid-guiding structure; 12, magnet; 13, fluid-returning assembly; 131, seal for the fluid-returning assembly; 132, stop ring for seal for the fluid-returning assembly; 133, connector of fluid-returning pipe; 134, fluid-returning pipe; 14, framework oil seal; 15, screw cover; 16, dust wiper; 17, test bench; 171, base of test bench; 172, connector to fix compact testing module; 173, fixing structure for high-low temperature test chamber; 174, high-low temperature test chamber; 175, stand column; 176, hydraulic cylinder for cross beam position adjusting; 177, load sensor; 178, adjustable cross beam; 179, cross beam fastener; 1710, installation block for hydraulic servo-actuator; 18, hydraulic servo-actuator assembly; 181, displacement transducer; 182, actuator; 183, hydraulic servo valve; 184, rod of actuator; 19, hydraulic power station; 20, control cabinet; 201, control cabinet body; 202, monitor; 203, panel of lights and buttons; 204, keyboard box; 205, printer; 206, controller; 207, host computer; 208, power source and secondary instrument; 21, strong current cabinet; 211, body of strong current cabinet; 212, voltmeter; 213, ampere meter; 214, air switch module; 22, control signal and weak current cables; 221, control signal and weak current cables connecting control cabinet and strong current cabinet; 222, control signal and weak current cables connecting control cabinet and test bench; 223, control signal and weak current cables connecting control cabinet and hydraulic power station; 23, strong current cables; 231, strong current cables connecting control cabinet and strong current cabinet; 232, strong current cables connecting strong current cabinet and hydraulic power station; 233, strong current cables connecting strong current cabinet and test bench; 24, hydraulic power hoses.

DETAILED DESCRIPTION OF THE EMBODIMENTS

The present application will now be more particularly described, by way of example only, with reference to the accompanying drawings.

FIGS. 1-8 show an exemplary embodiment of a compact testing module for dynamic characteristics experiments of hydraulic damper valve according to this application. The compact testing module includes an outer cylinder assembly 2, a guide seat assembly 3, a foam/air separator for guide seat 4, an inner cylinder 5, a piston-and-rod assembly 6, fluid 7, a foot valve assembly 8, a washer for the inner cylinder 9, a washer for the foot valve assembly 10, a fluid-guiding structure 11, a magnet 12, a fluid-returning assembly 13, a framework oil seal 14, a screw cover 15 and a dust wiper 16. The fluid-guiding structure 11 is connected with and placed in the bottom of the outer cylinder assembly 2, the washer 10 for the foot valve assembly is placed on a seat of the fluid-guiding structure 11, the foot valve assembly 8 is placed on the washer 10 for the foot valve assembly 8, the washer 9 for the inner cylinder is placed in an annulus groove in a valve body of the foot valve assembly 8, the inner cylinder 5 is placed on the washer 9 for the inner cylinder 5, the foam/air separator for guide seat 4 is placed on the inner cylinder 5, the guide seat assembly 3 is placed on the foam/air separator for guide seat 4, the guide seat assembly 3 is connected with an outer cylinder 21 of the outer cylinder assembly 2 by threads, when screwing down the guide seat assembly 3, the guide seat assembly 3 will press and fix the foam/air separator for guide seat 4, the inner cylinder 5, the washer for the inner cylinder 9 and the foot valve assembly 8 together against the bottom of the outer cylinder assembly 2; the outside surfaces of the framework oil seal 14, the screw cover 15 and the dust wiper 16 are connected with the guide seat assembly 3, and the inside surfaces thereof are connected with the piston-and-rod assembly 6; the outside surface of the piston 63 in the piston-and-rod assembly 6 is connected with the inside surface of the inner cylinder 5, the piston 63 can slide in the inner cylinder 5, the rod 61 passes through the guide seat assembly 3, the framework oil seal 14, the screw cover 15 and the dust wiper 16; the upper part of the fluid-returning assembly 13 is connected with the inner cylinder 5, and the lower part thereof is connected with the fluid-guiding structure 11; the magnet 12 is connected with the fluid-guiding structure 11; all of the inner chamber of the inner cylinder 5 and over two-third of a chamber formed between the inner cylinder 5 and the outer cylinder 21 of the outer cylinder assembly 2 is filled with fluids 7.

As illustrated by FIG. 1, the outer cylinder assembly 2 includes an outer cylinder 21 and an end attachment 22, the outer cylinder 21 is welded with the end attachment 22 to form an integrated container; the fluid-guiding structure 11 includes a seat 111 and a guiding plate 112, the fluid-guiding structure 11 is placed in the bottom of the outer cylinder assembly 2; the washer for the foot valve assembly 10 is placed on the seat 111 of the fluid-guiding structure 11.

The foot valve assembly 8 includes a screw cap 81, a spiral spring 82, a shim 83 and a valve body 84, after passing through the spiral spring 82 and the shim 83, the screw cap 81 is connected with the valve body 84 by threads thereof. The whole foot valve assembly 8 is placed on the washer for the foot valve assembly 10.

The washer 9 for the inner cylinder 5 is made of copper and placed in the annulus groove of the valve body of the foot valve 84, the inner cylinder 5 is placed on the washer 9 for the inner cylinder 5; when the inner cylinder 5 is pressed against the washer 9 for the inner cylinder 5, the washer 9 for the inner cylinder 5 acts as an end seal.

The guide seat assembly 3 is connected with the outer cylinder 21 of outer cylinder assembly 2 by threads and can move up and down, the lower end of the guide seat assembly 3 contacts with the upper end of the inner cylinder 5. When screwing down the guide seat assembly 3, the inner cylinder 5 is pressed and fixed between the guide seat assembly 3 and the foot valve assembly 8, thus, the inside of the inner cylinder 5 becomes an enclosed working chamber, the outside chamber formed between the inner cylinder 5 and the outer cylinder 21 of outer cylinder assembly 2 becomes a fluid reservoir, all of the working chamber and over two-third of the fluid reservoir is filled with fluids 7; the foam/air separator for guide seat 4 is made of copper and fixed between the guide seat assembly 3 and the inner cylinder 5, it functions as both a seal and a separator which will prevent foam and air from entering the guide seat assembly 3, especially the valve being tested 32.

Figure 3:
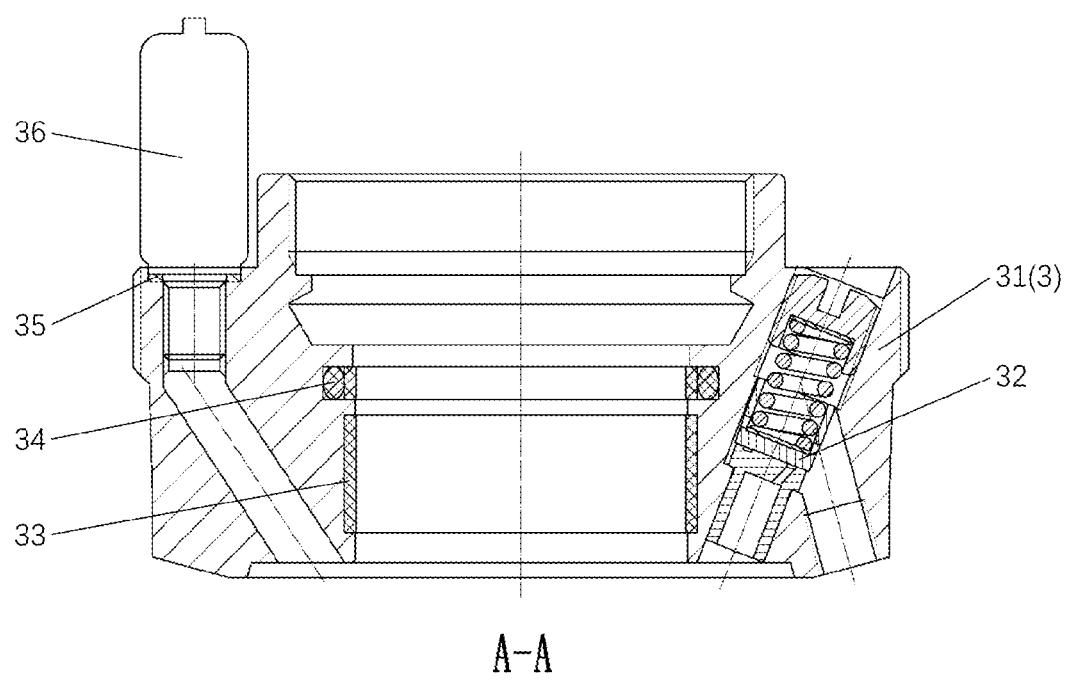
FIG. 3 is a A-A cross-section view of FIG. 2.
Figure 4:
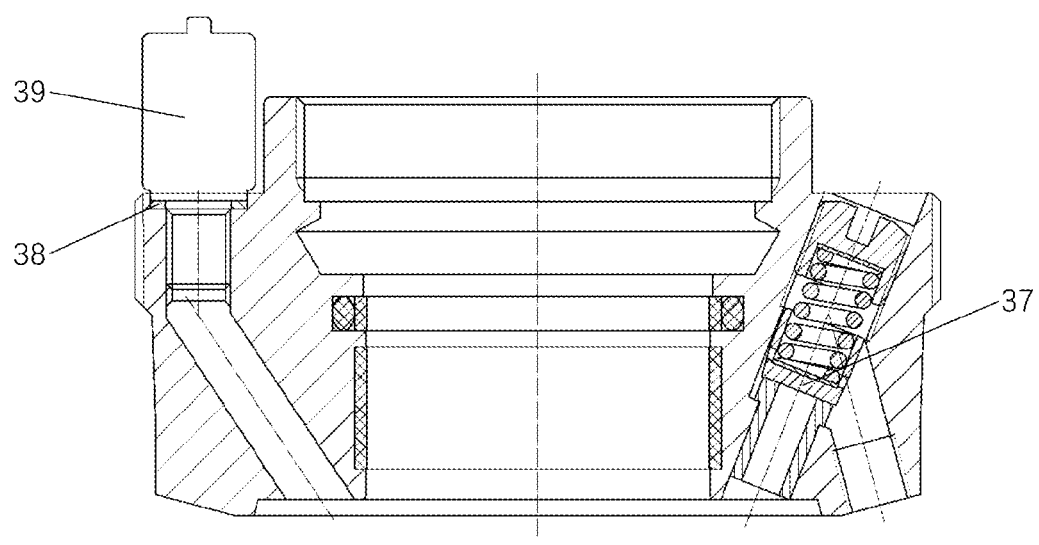
FIG. 4 is a B-B cross-section view of FIG. 2.

As illustrated by FIGS. 3-4, the guide seat assembly 3 includes a guide seat 31, a valve being tested 32, a wear ring 33, a Glyd ring 34, an end seal 35 for the pressure sensor, a pressure sensor 36, a safety valve 37, an end seal 38 for the temperature sensor and a temperature sensor 39.

Figure 5:
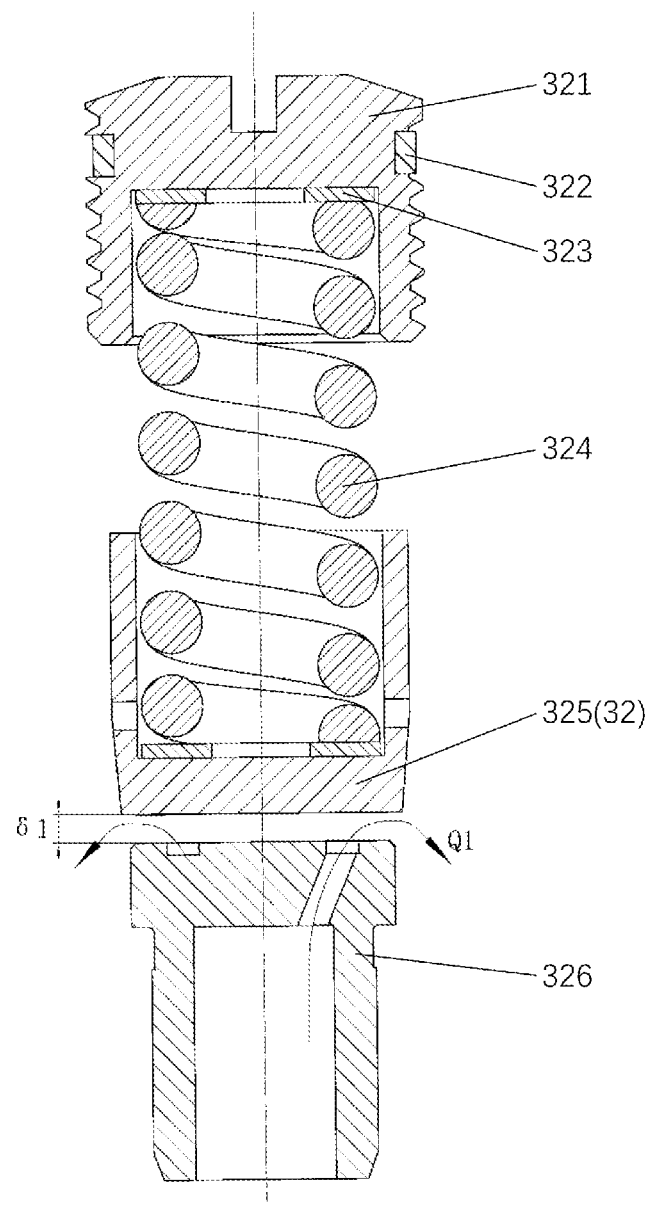
FIG. 5 is an illustration of structure and working principle of the valve being tested of FIG. 3.

As illustrated by FIG. 5, the valve being tested 32 includes an adjusting screw cap 321, an anti-loose seal 322 for adjusting the screw cap 321, two adjusting washers 323, a spring 324, a spool 325 and a seat 326. The seat 326 is pressed into a hole in the guide seat 31 using a special tool; the spool 325 is placed on the seat 326 and can slide in the hole in the guide seat 31; the spring 324 is seated in the spool 325, and one of the two adjusting washers 323 is placed between the spring 324 and the spool 325; the adjusting screw cap 321 is placed on the top of the spring 324, and the other of the two adjusting washers 323 is placed between the adjusting screw cap 321 and the spring 324; the adjusting screw cap 321 is connected with the valve house of the guide seat 31 by threads thereof such that screwing the adjusting screw cap 321 will adjust the initial compressed length of the spring 324; the anti-loose seal 322, which is made of oil resistant rubber, is placed in an annulus groove in the adjusting screw cap 321, and serves as both a seal and an anti-loose element.

When a valve is being tested, if naming the height of the squeezed oil film produced between the spool 325 and the seat 326 when the valve 32 is blown off by high pressure fluids as $\delta1$, naming the flow rate passing through the orifice in the seat of the valve 326 as Q1, the dynamic characteristics of the valve 32 will be measured. Thus, when different valve with different values of the orifice diameter and length, different parameters of the annulus grooves on the seat 326 is used, the dynamic characteristics of the different valve will be obtained.

Figure 6:
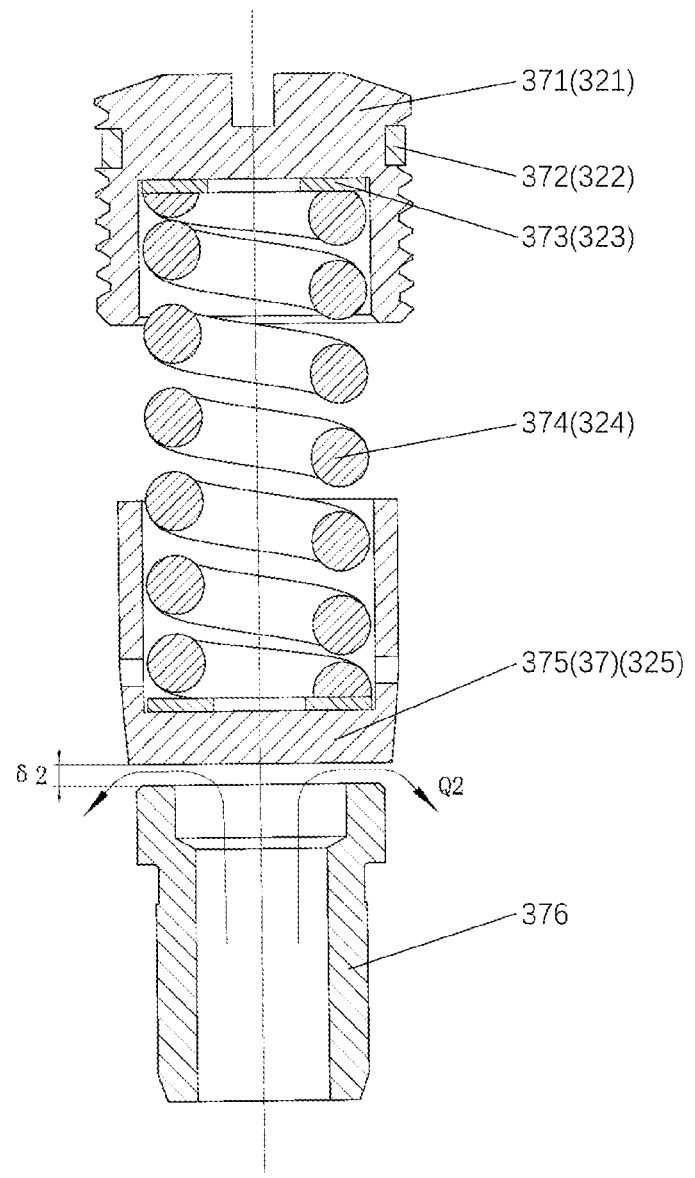
FIG. 6 is an illustration of structure and working principle of a safety valve of FIG. 4.

As illustrated by FIG. 6, the safety valve 37 has almost the similar structure and principle to that of the valve being tested 32, except for the valve seat 376; In most of the cases, the safety valve 37 remains closed, however, it will open and relieve the fluids when the fluid pressure is very high and exceeds the preset value, so the compact testing module 1 would be protected in this case; the height of the squeezed oil film produced between the spool 375 and the seat 376 of the safety valve is $\delta2$, the relief flow rate of the safety valve 37 is Q2.

The pressure sensor 36 and the temperature sensor 39 are both connected with the guide seat 31 by threads thereof; to prevent leakage, the end seal for the pressure sensor 35 is placed between pressure sensor 36 and the guide seat 31, the end seal for the temperature sensor 38 is placed between temperature sensor 39 and the guide seat 31.

The wear ring 33 and the Glyd ring 34 are all placed in the annulus grooves in the inside surface of the guide seat 31, the wear ring 33 can reduce wears of the rod 61 and the guide seat 31, the Glyd ring 34 can prevent fluid leakage between the annulus gap of the rod 61 and the guide seat 31.

Figure 7:
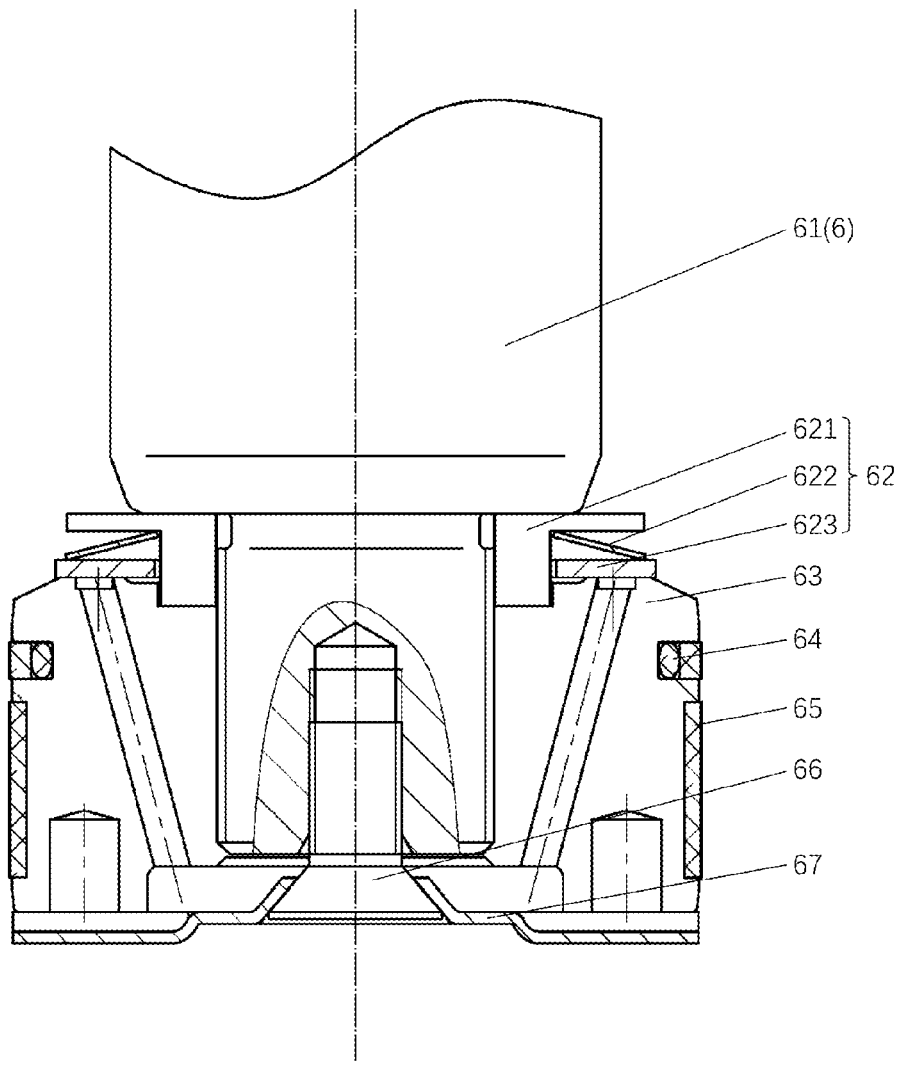
FIG. 7 is a structural illustration of a piston-and-rod assembly in the compact testing module.
Figure 8:
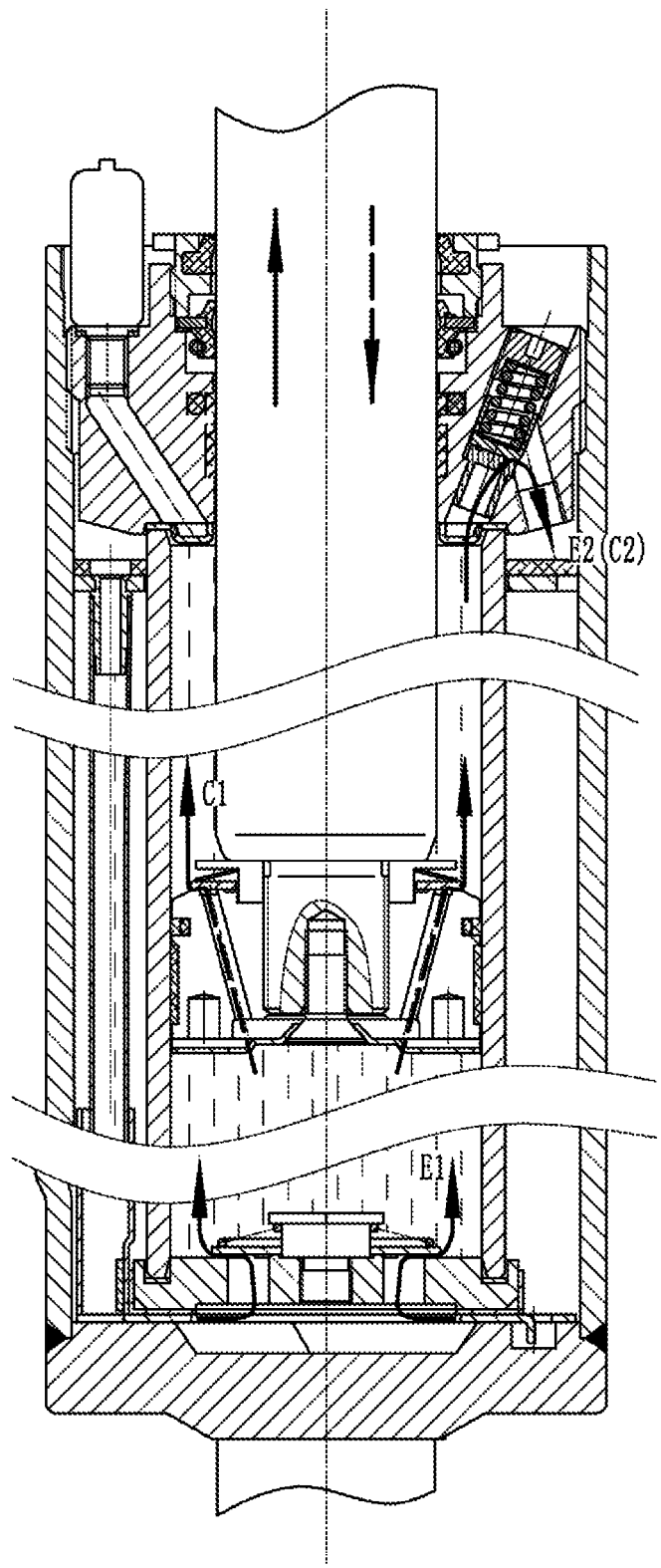
FIG. 8 is a working principle of the compact testing module.

As illustrated by FIG. 7, the piston-and-rod assembly 6 includes a rod 61, a piston valve unit 62, a piston 63, a Glyd ring 64, a wear ring 65, an inner hexagon screw 66 and a foam/air separator for piston 67. The piston valve unit 62 comprises a cover 621, a wave spring 622 and a shim 623.

After sequentially passing through the cover 621, the wave spring 622 and the shim 623, the rod 61 is connected with the piston 63 by its threads, and finally makes the rod 61, the piston valve unit 62 and the piston 63 to be one assembly; the piston 63 can slide in the inner cylinder 5, the Glyd ring 64 and the wear ring 65 are all placed in the annulus grooves in the outside surface of the piston 63, the Glyd ring 64 serves as a high pressure seal between the piston 63 and the inner cylinder 5, the wear ring 65 can reduce wears of the piston 63 and the inner cylinder 5.

The upper end of the rod 61 sequentially passes through the inside surfaces of the guide seat assembly 3, the framework oil seal 14, the screw cover 15 and the dust wiper 16; the framework oil seal 14 prevents fluid leakage from the gap between the rod 61 and the guide seat 31, the dust wiper 16 resists dust invasion to the compact testing module by wiping the moving rod 61; the screw cover 15 is connected with the guide seat 31 by threads, and fixes the framework oil seal 14 and the dust wiper 16; the working chamber and over two-third of the fluid reservoir is filled with fluids 7.

The piston-and-rod assembly 6 separates the working chamber in the inner cylinder 5 into two sections, i.e., the upper working chamber and the lower working chamber. The inner hexagon screw 66 is connected with the rod 61 after passing through the foam/air separator for piston 67, so the foam/air separator for piston 67 is fixed on the bottom of the piston 63, it can prevent foam and air in the lower working chamber from entering to the upper working chamber.

When the rod 61 is driven up and down by the actuator 182, the piston- and -rod assembly 6 becomes as a pressure fluid supplier to the valve being tested 32 in the guide seat assembly 3, if changing the excitation laws of the actuator 182, then different inputs to the valve being tested 32 would be obtained; the pressure and temperature of fluids passing through the valve 32 are measured by the pressure sensor 36 and the temperature sensor 39, respectively.

The returning fluids of the valve being tested 32 and the safety valve 37 can all flow back to the fluid reservoir through the passages in the guide seat; when the rod 61 is moving up and down, the piston valve unit 62 and the foot valve assembly 8 work cooperatively and circulate the fluids between the working chamber and the fluid reservoir.

As illustrated by FIG. 1, the fluid-returning assembly 13 includes a seal 131, a stop ring 132, a connector of fluid-returning pipe 133 and a fluid-returning pipe 134. The seal 131 is placed on the stop ring 132, the seal 131 and the stop ring 132 are fixed on the inner cylinder 5 by wrapping the outside surface of the inner cylinder 5; the connector of fluid-returning pipe 133 is screwed in the stop ring 132; the upper end of the fluid-returning pipe 134 is connected with the connector of fluid-returning pipe 133, while the lower end thereof is inserted into the guiding plate 112 of the fluid-guiding structure 11.

When the rod 61 is driven up by the actuator 182 (the solid arrow direction in FIG. 8), the passages in the piston 63 will be closed by the shim of piston valve 623, so the working chamber above the piston 63 will become a high-pressure chamber; simultaneously, the passages in the valve body of foot valve 84 will be opened by the shim of foot valve 83 due to suction action of the piston 63, so the fluids in the fluid reservoir are sucked (direction of the solid arrow E1 in FIG. 8) into the working chamber below the piston 63 to compensate for its volume change due to piston movement.

Thus, the piston-and-rod assembly 6 becomes as a pressure fluid supplier to the valve being tested 32 in the guide seat assembly 3, the high-pressure fluids 7 are forced through the valve being tested 32 and flow back to the fluid reservoir through the passages in the guide seat 31 (direction of the solid arrow E2 in FIG. 8); the fluid-returning assembly 13 directly guides the returned fluids to the bottom of the outer cylinder assembly 2, so this action will prevent the fluids from mixing with the air in the upper section of the fluid reservoir; the magnet 12 is placed in the bottom of the fluid-returning assembly 13 to adsorb metal debris and particles in the fluids 7; if the safety valve 37 is opened, the discharged fluids also flow back to the fluid reservoir by passing through the passages in the guide seat 31 and guidance of the fluid-returning assembly 13.

If changing the excitation laws of the actuator 182, then different inputs to the valve being tested 32 would be obtained; the pressure and temperature of fluids passing through the valve 32 are measured by the pressure sensor 36 and the temperature sensor 39, respectively.

When the rod 61 is driven down by the actuator 182 (the dotted arrow direction in FIG. 8), the passages in the valve body of foot valve 84 will be closed by the shim of foot valve 83 due to compression action of the piston 63, at the same time, the passages in the piston 63 will be opened by the shim of piston valve 623, then the fluids below the piston 63 are forced into the chamber above the piston 63 (direction of the dotted arrow C1 in FIG. 8), thus, the two working chambers that above and below the piston 63 are united to be a whole high pressure chamber.

Similarly, the high-pressure fluids 7 are forced through the valve being tested 32 and flow back to the fluid reservoir through the passages in the guide seat 31 (direction of the solid arrow C2 in FIG. 8), the fluid-returning assembly 13 directly guides the returned fluids to the bottom of the outer cylinder assembly 2. If the safety valve 37 is opened, the discharged fluids also flow back to the fluid reservoir by passing through the passages in the guide seat 31 and guidance of the fluid-returning assembly 13.

The above technical solution integrates the fluids 7, the pressure fluid supplier (i.e., the piston-and-rod assembly 6), the valve being tested 32 and the sensors (36, 39) into a damper-like, all-in-one compact testing module 1, thus, the whole compact testing module 1 can be readily placed into the high-low temperature test chamber 174 where the fluid temperature can be controlled effectively and accurately. The proposed compact testing module 1 has solved the unwieldy and cost-ineffective problems of current testing apparatus which employs a large and complicated hydraulic power unit and temperature control system.

Figure 9:
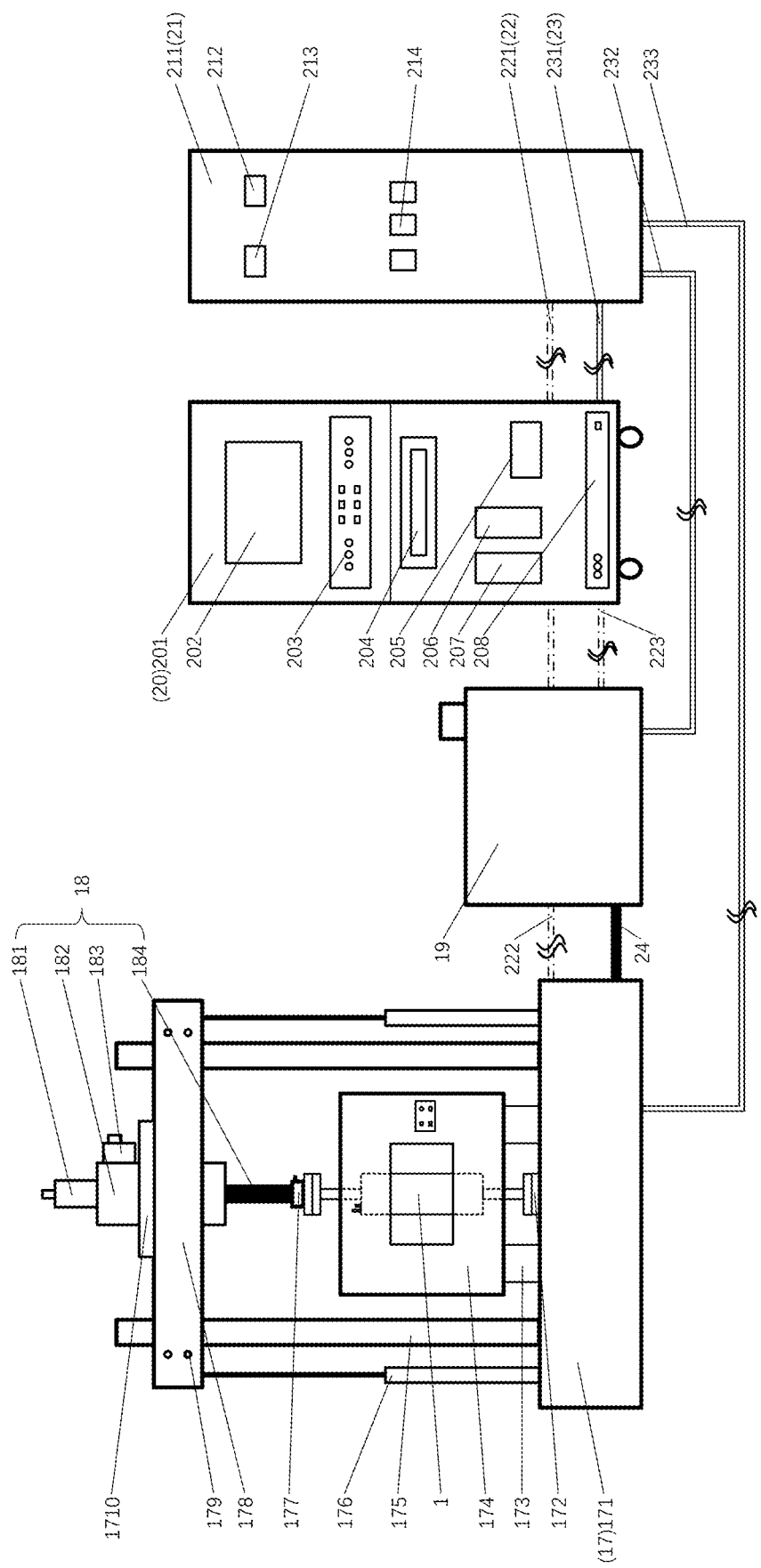
FIG. 9 is a configuration illustration of the automated system for dynamic characteristics experiments of hydraulic damper valve according to this application.
Figure 10:
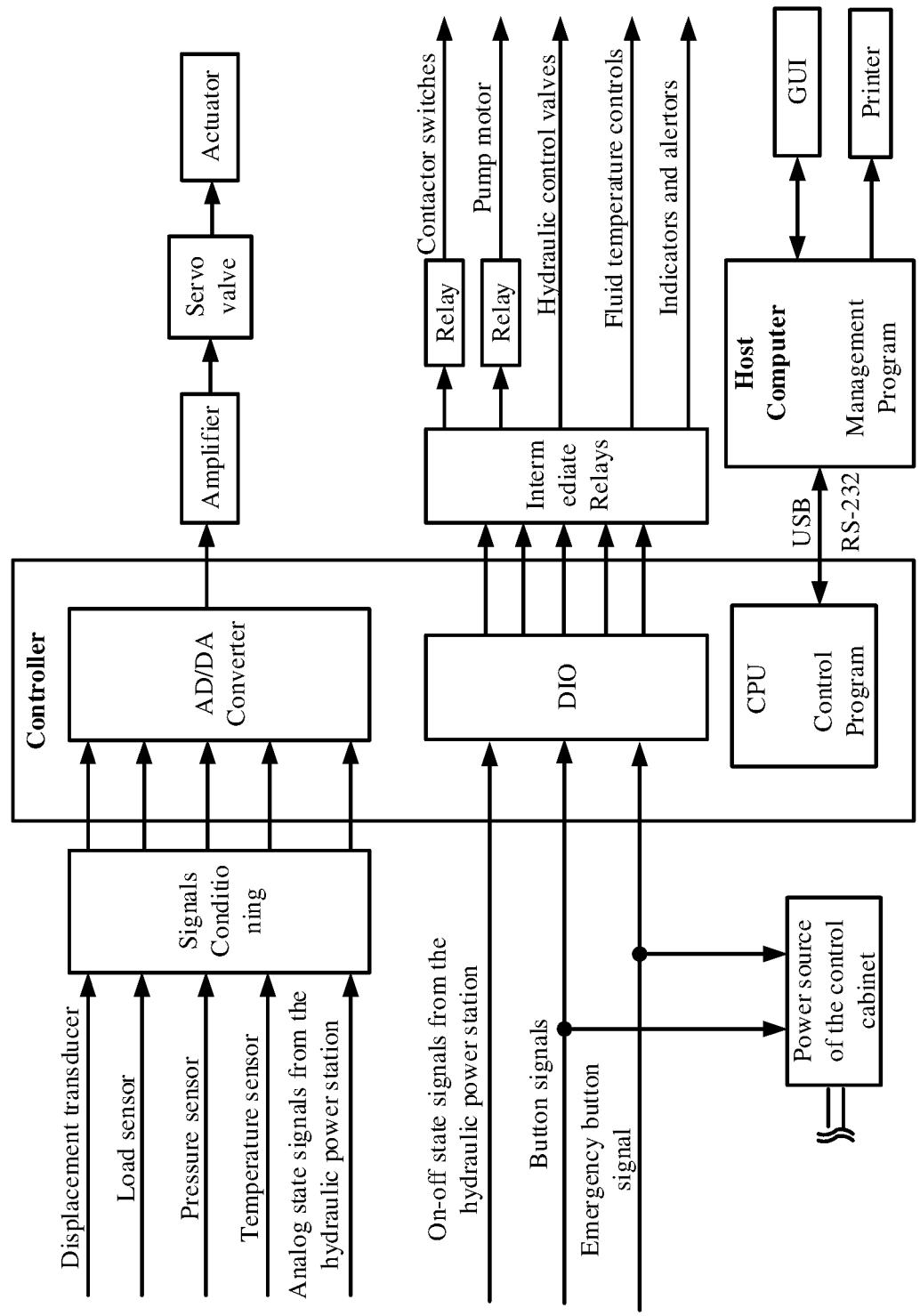
FIG. 10 is a computer-aided measurement and control principle of the automated system according to this application.
Figure 11:
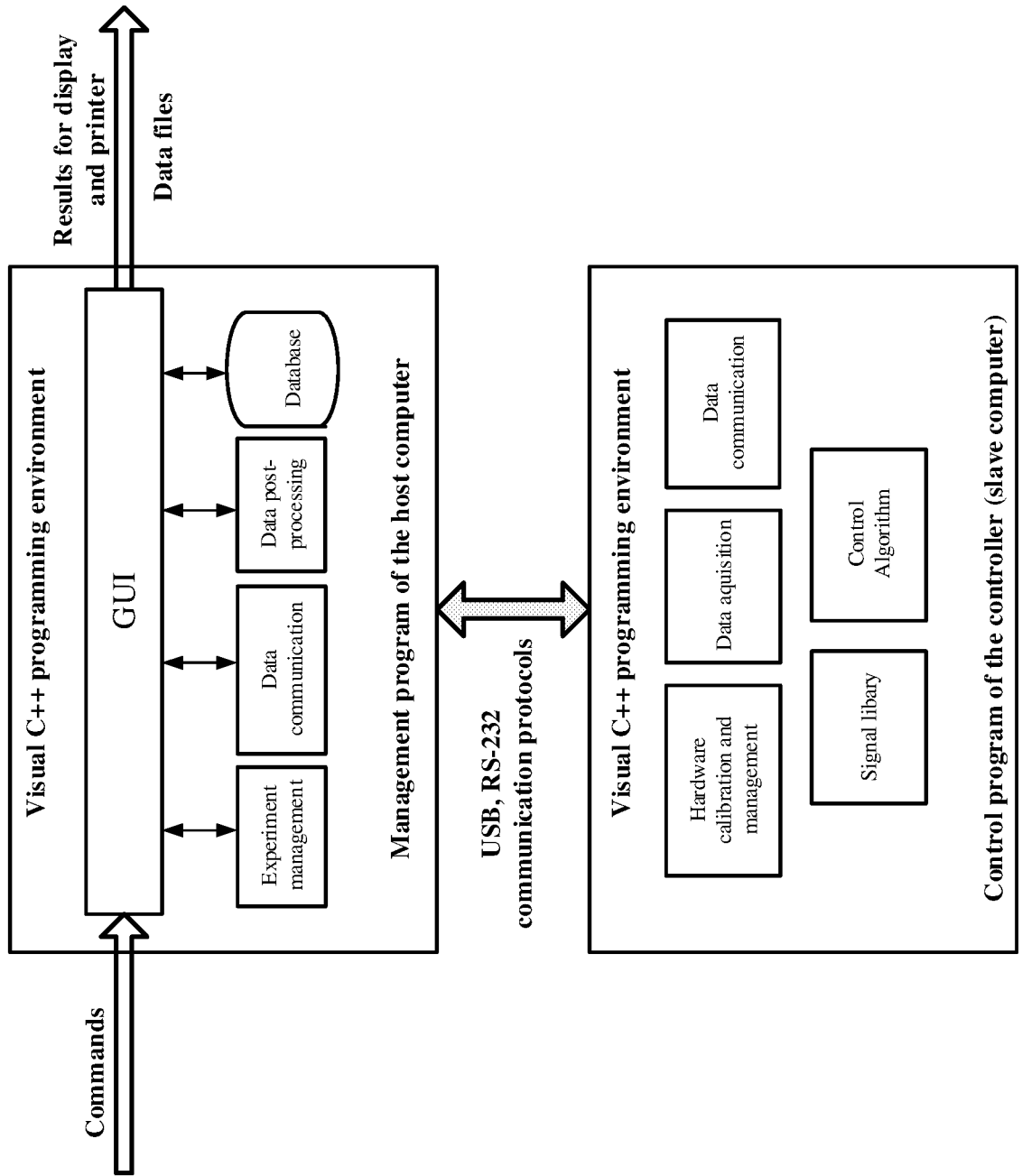
FIG. 11 is a modules and principle illustration of a software of the automated system according to this application.

FIGS. 9-11 show an exemplary embodiment of the automated system for dynamic characteristics experiments of hydraulic damper valve according to this application. The automated system includes the compact testing module 1 described above, a test bench 17, a hydraulic servo-actuator assembly 18, a hydraulic power station 19, a control cabinet 20, a strong current cabinet 21, control signal or weak current cables 22, strong current cables 23 and hydraulic power hoses 24.

The test bench 17 includes a base 171, connectors to fix compact testing module 172, fixing structure for the high-low temperature test chamber 173, a high-low temperature test chamber 174, stand columns 175, hydraulic cylinders for cross beam position adjusting 176, a load sensor 177, an adjustable cross beam 178, cross beam fasteners 179 and an installation block for hydraulic servo-actuator 1710.

The base of test bench 171 is a heavy structure made of cast iron or steel; the stand columns 175, which are the main components bearing the load, are connected with the base 171 by bolts or plug pins; the test bench employs two stand columns; the adjustable cross beam 178 can slide along the stand columns 175, the position of the adjustable cross beam 178 is adjusted by the hydraulic cylinders for cross beam position adjusting 176; During the preparation of an experiment, a proper position of the adjustable cross beam 178 can be decided and adjusted by considering the travel of the compact testing module 1 and the testing conditions, when a proper position is adjusted, the hydraulic cylinders for cross beam position adjusting 176 can be hydraulically locked, and the adjustable cross beam 178 can be fixed on the stand columns 175 by cross beam fasteners 179.

The lower end of the fixing structure for high-low temperature test chamber 173 is connected with the base of test bench 171, while its upper end is connected with the high-low temperature test chamber 174, thus, the high-low temperature test chamber 174 is installed on the base of test bench 171.

The compact testing module 1 is vertically placed in the high-low temperature test chamber 174 of the test bench 17, the two end attachments of the compact testing module 1 both reach out of the holes upon the high-low temperature test chamber 174, and some special seal materials capable of thermal insulation are filled with the clearances between the end attachments of the compact testing module 1 and the holes upon the high-low temperature test chamber 174; the upper end attachment of the compact testing module 1 is connected with the load sensor 177 through the connector to fix compact testing module 172, the load sensor 177 is connected with the rod of actuator 184 in the hydraulic servo-actuator assembly 18, the lower end attachment of the compact testing module 1 is connected with the base 171 of the test bench 17.

The hydraulic servo-actuator assembly 18 includes a displacement transducer 181, an actuator 182, a hydraulic servo valve 183 and the rod of actuator 184, the displacement transducer 181 is used to measure the dynamic displacement of the rod of actuator 184; the whole hydraulic servo-actuator assembly 18 is fixed on the adjustable cross beam 178 in the test bench 17 through the installation block for hydraulic servo-actuator 1710.

The hydraulic servo-actuator assembly 18 is connected with and powered the hydraulic power station 19 through the hydraulic power hoses 24, when it actuates the compact testing module 1 using particular excitation laws, the dynamic characteristics of the hydraulic damper valve can be tested.

The control cabinet 20 includes a control cabinet body 201, a monitor 202, a panel of lights and buttons 203, a keyboard box 204, a printer 205, a controller 206, a host computer 207 and a power source and secondary instrument 208. The control cabinet 20 is an apparatus where all the input sensor signals, output control signals and test results processing, documentation and output are processed, all of the measurement and control components are installed in the control cabinet body 201.

The strong current 21 includes a body 211, a voltmeter 212, an ampere meter 213 and an air switch module 214. The strong current 21 is an apparatus where all the strong current elements are installed.

The automated system for dynamic characteristics experiments of hydraulic damper valve is designed by modularization and integration approaches, in a macro sense, the automated system can be divided into four modules in the macro: an integration of test unit, a hydraulic power station 19, a control cabinet 20 and a strong current cabinet 21, the integration of test unit is a whole unit comprising the test bench 17, the compact testing module 1 and the hydraulic servo-actuator assembly 18.

The control cabinet 20 is connected with the strong current cabinet 21 by control signal and weak current cables 221 and strong current cables 231, and is connected with the test bench 17 by control signal and weak current cables 222, and is connected with the hydraulic power station 19 by control signal and weak current cables 223; the strong current cabinet 21 is connected with the hydraulic power station 19 by strong current cables 232, and is connected with the test bench 17 by strong current cables 233; the test bench 17 is connected with the hydraulic power station 19 by hydraulic power hoses 24, the hydraulic power hoses 24 includes hoses supplying pressure fluid to the hydraulic servo-actuator assembly 18 and that supplying pressure fluid to the two hydraulic cylinders for cross beam position adjusting 176.

The four modules of the automated system can be easily connected or disconnected by simply connect or disconnect the various cables and hydraulic power hoses, so it is very convenient to perform system installation, adjusting, move and management.

As illustrated by FIG. 10, the proposed automated system for dynamic characteristics experiments of hydraulic damper valve uses the modern computer-aided measurement and control principle and operates by a host computer communicating with a slave computer. Signals from the displacement transducer 181, load sensor 177, pressure sensor 36, temperature sensor 39, and the pressure, flow and oil temperature information from the hydraulic power station 19 are all conditioned and sent to the AD/DA converter in the controller 206, signals including the on-off monitoring information from the hydraulic power station 19, the on-off signals of the manipulation buttons and emergency button from the automated system are also sent to the DIO board card in the controller 206; after information processing, the controller 206 controls the actuator 182 by driving the amplifier and the hydraulic servo valve 183 through AD/DA converter, the controller 206 also drives the intermediate relays through the DIO board card and then controls the pump motor, various hydraulic valves, oil temperature controls in the hydraulic power station 19, strong current contactors, various lights and the emergent alarm; the electrical power can be directly controlled by buttons and the emergency button, however, the manipulation signals of buttons and the emergency button are also sent to the controller 206.

The controller 206 is a slave computer, it communicates with the host computer 207 by USB or RS-232 protocols, and sends the collected datum to the host computer 207 for post processing, the host computer 207 then communicates with the human being by GUI, monitor and printer.

As illustrated by FIG. 11, the software of the proposed automated system for dynamic characteristics experiments of hydraulic damper valve is developed by using the Visual C++ programming module in the Visual Studio. Net environment, in a macro sense, the software includes the control program in the controller 206 and the management program in the host computer 207, the two programs communicates using serial communication protocols.

The control program in the controller 206 controls data acquisition, hardware driving and management of the automated system. The control program includes the data acquisition module, the signal library, the control module, the data communication module and the module for hardware calibration and management; the signal library includes various functions such as the step, the harmony and the saw-tooth ones, so the controller 206 can control the actuator 182 by using the functions.

The management program in the host computer 207 manages the experiments and data post-processing. The management program includes the experiment management module, the data communication module, the data processing module and the database module. The experiment management module receives parameter preset and control orders from the human being, such as the date and time of experiment, name of the technician, which kind of experiment, manual or automatic manipulation; the management program in the host computer 207 can control the hardware by communicating with the control program in the controller 206, obtain the test data acquired by the controller 206, perform post-processing of the data, and then save the results into the database or output by GUI and printer.

The data processing module can perform error analysis, interpolation analysis, curve plotting and test report output of the experiment; the database module can output standard DATA or EXCEL files for the user.

Figure 12:
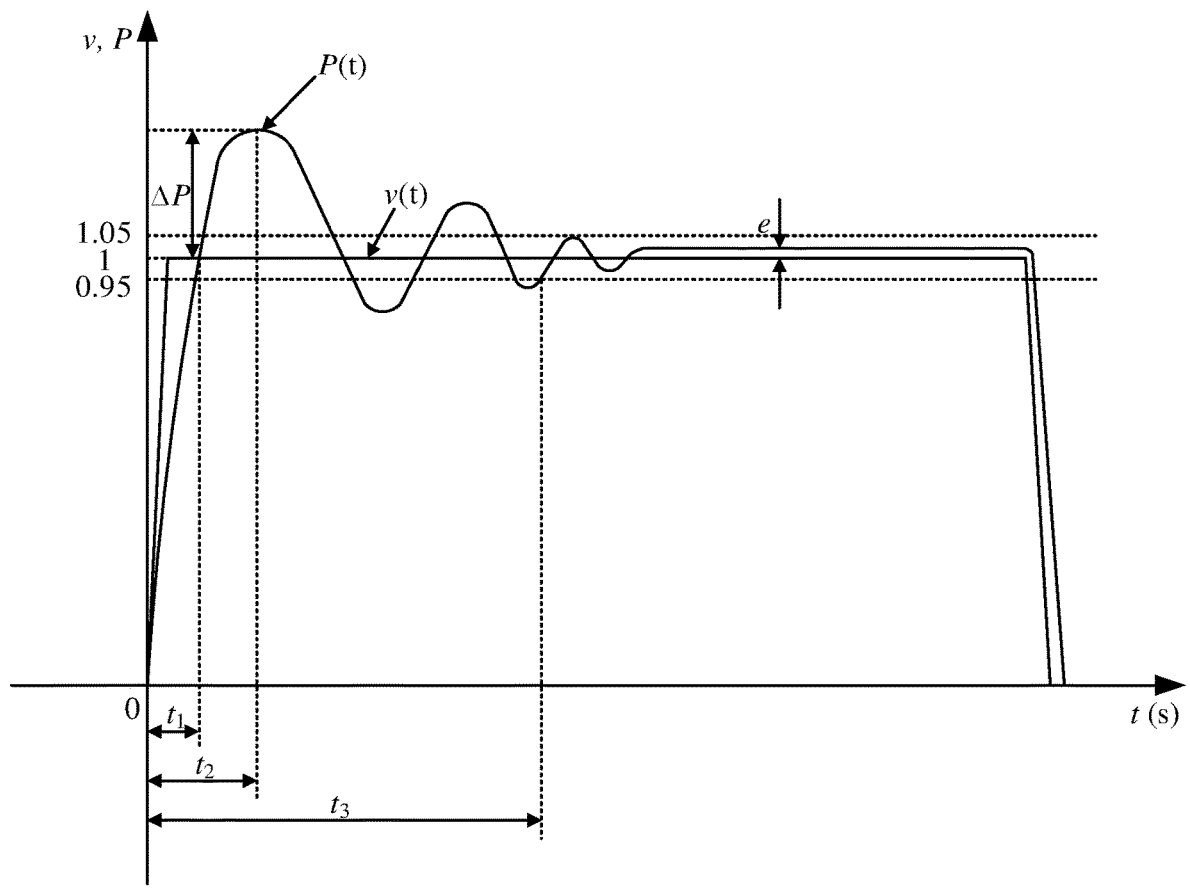
FIG. 12 is an illustration of a normalized curves and indices of step response of a hydraulic damper valve being tested according to this application.
Figure 13:
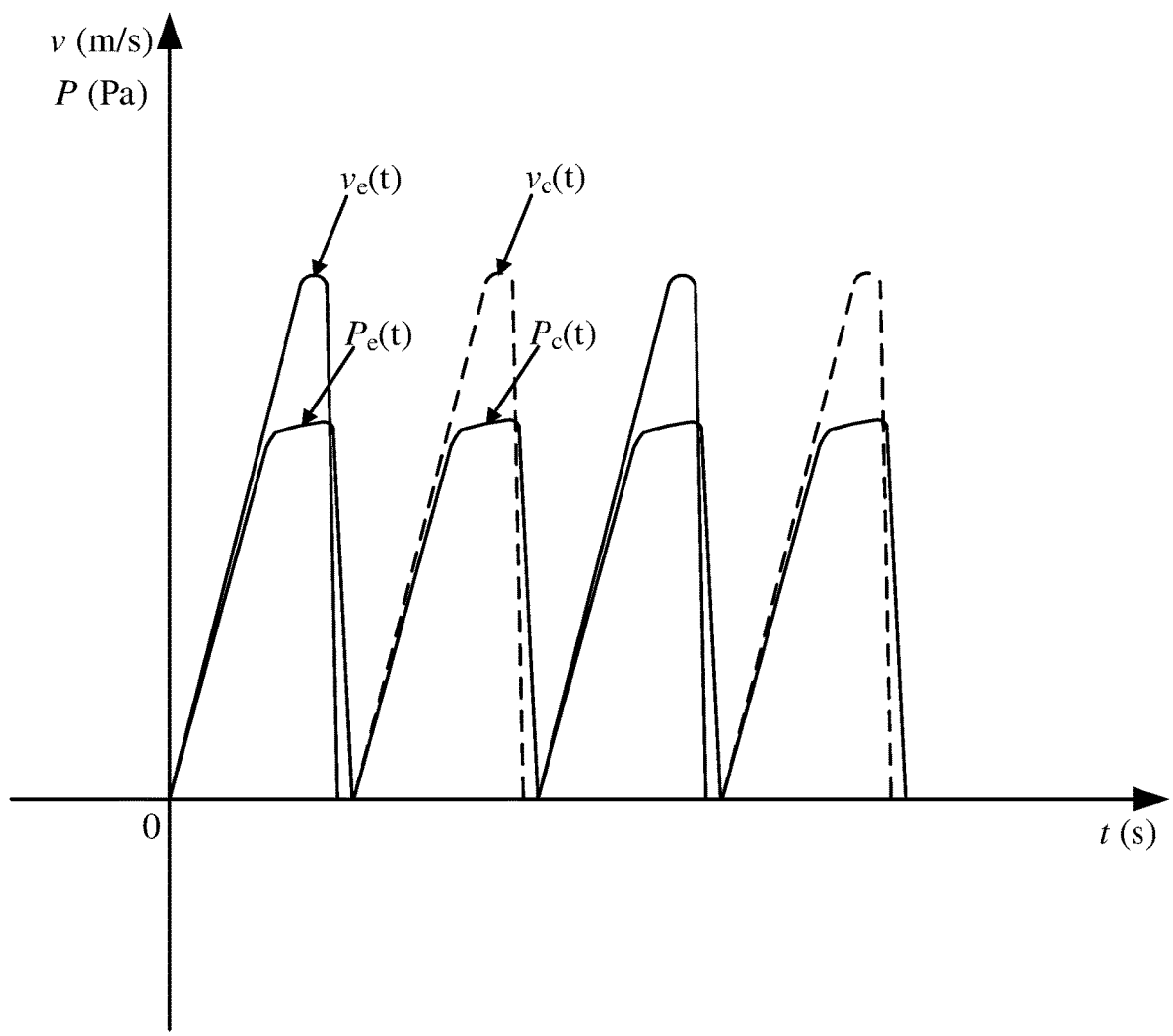
FIG. 13 is an illustration of the curves and indices of saw-tooth function response of a hydraulic damper valve being tested according to this application.

FIGS. 12-13 shows an exemplary embodiment of the proposed experimentation approach for dynamic characteristics experiments of hydraulic damper valve, the experiment uses the exemplary embodiments of the proposed compact testing module 1 and the automated system.

Installing the compact testing module 1 vertically in the high-low temperature test chamber 174 in the test bench 17, setting the desired environment temperature of the high-low temperature test chamber 174, like −30° C., and then maintaining that temperature no less than 24 hours after the desired temperature is reached.

(1) When started, manipulating the hydraulic servo-actuator assembly 18 manually and slowly, compressing the compact testing module 1 close to its shortest length and pausing; selecting the step function (FIG. 12) as the excitation signal, and actuating the compact testing module 1, i.e., the compact testing module 1 is stretched out (accelerated) abruptly to reach a desired speed, after maintaining that speed for a period of time, the compact testing module 1 is stopped abruptly; at the same time, acquiring the data which describing the dynamic characteristics of the hydraulic damper valve, post-processing the data, saving and outputting the results, all by using the automated system. Experiment could also be carried out when the compact testing module 1 is stretched out and close to its longest length, step function excitation and similar method can also be applied by compressing the compact testing module 1 to obtain the dynamic characteristics of the hydraulic damper valve.

FIG. 12 is an illustration of the normalized curves and indices of step response of a hydraulic damper valve being tested according to this application. In FIG. 12, v(t) is the normalized input step function, P(t) is the normalized step response curve of the fluid pressure at the entrance of the hydraulic damper valve being tested, $t_1$, $t_2$, $t_3$ are respectively the response time, the peak time and the transient process time of the valve being tested, $\Delta P$ is the pressure overshoot, and e is the steady-state error of the valve being tested.

(2) The dynamic open-and-close (or on-off) characteristics of the hydraulic damper valve being tested can be obtained by applying the saw-tooth function excitations. When started, manipulating the hydraulic servo-actuator assembly 18 manually and slowly, compressing the compact testing module 1 close to its shortest length and pausing; selecting the saw-tooth function (FIG. 13) as the excitation signal, and actuating the compact testing module 1, i.e., the compact testing module 1 is accelerated linearly to reach a desired speed, and then stopped abruptly; at the same time, acquiring the data which describing the dynamic open-and-close characteristics of the hydraulic damper valve, post-processing the data, saving and outputting the results, all by using the automated system. Experiment could also be carried out if the compact testing module 1 is stretched out and close to its longest length, saw-tooth function excitation and similar method can also be applied by compressing the compact testing module 1 to obtain the dynamic open-and-close characteristics of the hydraulic damper valve.

FIG. 13 is an illustration of the curves and indices of saw-tooth function response of a hydraulic damper valve being tested. In FIG. 13, $v_e(t)$ is the input saw-tooth function, $P_e(t)$ is the saw-tooth response curve of the fluid pressure at the entrance of the hydraulic damper valve being tested. It can be observed from $v_e(t)$ and $P_e(t)$ that after the valve is blown off, the entrance pressure grows slowly or hardly grows (i.e., reaches saturation), when the input speed drops abruptly, the valve cannot close quickly, the close time of the valve lags behind the stop time of the saw-tooth function.

In FIG. 13, $v_c(t)$ is the input saw-tooth function (absolute value) when the compact testing module 1 is compressed, $P_c(t)$ is the saw-tooth response curve of the fluid pressure at the entrance of the hydraulic damper valve being tested when the compact testing module 1 is compressed.

The invention claimed is:

1. A compact testing module for use in the dynamic characteristics experiments of a hydraulic damper valve, wherein the compact testing module comprises:

an outer cylinder assembly with an outer cylinder, a guide seat assembly, a foam/air separator, an inner cylinder with an inner chamber, a piston-and-rod assembly with a piston and a rod, fluids, a foot valve assembly, a washer for the inner cylinder, a washer for the foot valve assembly, a fluid-guiding structure, a magnet, a fluid-returning assembly, a framework oil seal, a screw cover and a dust wiper;

wherein the fluid-guiding structure is connected with and placed in the bottom of the outer cylinder assembly, the washer for the foot valve assembly is placed on a seat of the fluid-guiding structure, the foot valve assembly is placed on the washer for the foot valve assembly, the washer for the inner cylinder is placed in an annulus groove in a valve body of the foot valve assembly, the inner cylinder is placed on the washer for the inner cylinder, the foam/air separator is placed on the inner cylinder, the guide seat assembly is placed on the foam/air separator, the guide seat assembly is connected with the outer cylinder of the outer cylinder assembly by threads such that when screwing down the guide seat assembly, the guide seat assembly presses the foam/air separator, the inner cylinder, the washer for the inner cylinder and the foot valve assembly together against the bottom of the outer cylinder assembly;

outside surfaces of the framework oil seal, the screw cover and the dust wiper are connected with the guide seat assembly, and inside surfaces thereof are connected with the piston-and-rod assembly;

an outside surface circle of the piston of the piston-and-rod assembly is connected with and slidable relative to the inside surface of the inner cylinder, the rod passing through the guide seat assembly, the framework oil seal, the screw cover and the dust wiper;

an upper part of the fluid-returning assembly is connected with the inner cylinder, and a lower part thereof is connected with the fluid-guiding structure;

the magnet is connected with the fluid-guiding structure;

all of the inner chamber of the inner cylinder and over two-third of a chamber formed between the inner cylinder and the outer cylinder of the outer cylinder assembly is filled with the fluids;

the guide seat assembly comprises a guide seat, a valve being tested, a safety valve, a pressure sensor, an end seal for the pressure sensor, a temperature sensor, an end seal for the temperature sensor, a wear ring and a Glyd ring, the pressure sensor and the temperature sensor are both connected with the guide seat by threads thereof;

the end seal for the pressure sensor is placed between the pressure sensor and the guide seat, the end seal for the temperature sensor is placed between the temperature sensor and the guide seat, the wear ring and the Glyd ring are respectively placed in different annulus grooves in the inside of the guide seat;

the valve being tested comprises an adjusting screw cap, an anti-loose seal for the adjusting screw cap, two adjusting washers, a valve spring, a valve spool and a valve seat, the valve seat is pressed into a hole in the guide seat;

the valve spool is placed on the valve seat and can slide in the hole in the guide seat;

the valve spring is seated in the valve spool with one of the two adjusting washers placed between the valve spring and the valve spool;

the adjusting screw cap is placed on the top of the valve spring with the other of the two adjusting washers placed between the adjusting screw cap and the valve spring;

the adjusting screw cap is connected with a valve house of the guide seat by threads thereof such that screwing the adjusting screw cap will adjust the initial length of the valve spring; and the anti-loose seal is placed in an annulus groove in the adjusting screw cap.

2. The compact testing module of claim 1, wherein the outer cylinder assembly comprises an end attachment, the outer cylinder is welded with the end attachment to form an integrated container; the fluid-guiding structure comprises a seat and a guiding plate, the fluid-guiding structure is placed in the bottom of the outer cylinder assembly; and the washer for the foot valve assembly is placed on the seat of the fluid-guiding structure.

3. The compact testing module of claim 1, wherein the foot valve assembly comprises a screw cap, a spiral spring, a shim and a valve body; the screw cap passes through the spiral spring and the shim and then connects with the valve body by threads thereof, and the whole foot valve assembly is placed on the washer for the foot valve assembly.

4. An automated system for testing dynamic characteristics of the valve being tested of the compact testing module of claim 1 under extreme high or low temperature conditions, wherein the automated system comprises a high-low temperature test chamber configured to receive the compact testing module, and a servo actuator assembly configured to excite the compact testing module to test the dynamic characteristics of the valve being tested.

5. The automated system of claim 4, wherein the automated system further comprises a test bench, a power station, a control cabinet, a strong current cabinet, control signal and weak current cables, strong current cables and power hoses; the test bench comprises a base, a fixing structure for the high-low temperature test chamber, stand columns, an adjustable cross beam, a mechanism configured to adjust position of the adjustable cross beam, cross beam fasteners, connectors to fix the compact testing module and an installation block for the servo actuator; and wherein the automated system is designed by modularization and comprises four modules which comprises an integrated test unit, the power station, the control cabinet and the strong current cabinet, the integrated test unit comprises the test bench, the compact testing module and the servo actuator assembly; and wherein the four modules can be easily connected or disconnected by simply connect or disconnect the various cables and power hoses.

6. The automated system of claim 5, wherein the base is made of cast iron or steel, the stand columns, which are the main components bearing the load, are connected with the base by bolts or plug pins, the test bench employs two or four stand columns; the cross beam can slide along the stand columns, when a proper position is adjusted, the cross beam can be fixed on the stand columns by fasteners; one end of the fixing structure is connected with the base, while another end thereof is connected with the high-low temperature test chamber, thus, the high-low temperature test chamber is installed on the base.

7. The automated system of claim 5, wherein the compact testing module can be placed in the high-low temperature test chamber of the test bench, the two end attachments of the compact testing module can both reach out of the holes upon the high-low temperature test chamber, and some special seal materials capable of thermal insulation are filled with the clearances between the end attachments of the compact testing module and the holes upon the high-low temperature test chamber; the upper end attachment of the compact testing module is connected with a load sensor by a connector, the load sensor is then connected with the actuator, and the lower end attachment of the compact testing module is connected with the base of the test bench by another connector.

8. The automated system of claim 5, wherein the servo actuator assembly comprises a displacement transducer, an actuator and a servo control unit, the servo actuator assembly is fixed on the test bench by an installation block, the displacement transducer is used to measure the dynamic displacement of the actuator; the servo-actuator assembly excites the compact testing module by using hydraulic, pneumatic or electrical power; the servo-actuator assembly is powered by a hydraulic, a pneumatic or an electrical power station, and is connected with the station by hydraulic hoses, pneumatic hoses or electrical cables; the servo-actuator assembly is installed on the adjustable cross beam or installed on the base.

9. An experimentation approach by using the automated system of claim 5, comprising:

installing the compact testing module in the high-low temperature test chamber in the test bench, setting a desired temperature of the high-low temperature test chamber, when the desired temperature is reached, then maintaining the high-low temperature test chamber at the desired temperature no less than 24 hours;

actuating the compact testing module, and obtaining and processing data of the dynamic characteristics of the valve being tested, and saving and outputting test results.

* * * * *